United States Patent [19]

Rees

[11] Patent Number: 4,511,187
[45] Date of Patent: Apr. 16, 1985

[54] BEARING ASSEMBLY FOR SEAT SLIDE

[75] Inventor: Richard W. A. Rees, West Bloomfield, Mich.

[73] Assignee: General Motors Corporation, Detroit, Mich.

[21] Appl. No.: 555,129

[22] Filed: Nov. 25, 1983

[51] Int. Cl.³ .................. A47B 88/14; A47C 1/023; F16C 21/00; F16M 13/00
[52] U.S. Cl. ................................. 308/3.8; 248/430; 297/341; 312/332; 312/341 R
[58] Field of Search .................. 308/3.8, 6 R, 215; 312/341 R, 350, 332; 248/429, 430; 297/318, 314, 341

[56] References Cited

U.S. PATENT DOCUMENTS

| 2,970,015 | 1/1961 | Ragsdale | 308/6 R |
| 3,350,046 | 10/1967 | Kirk | 308/3.8 X |
| 3,545,716 | 12/1970 | Colautti | 308/3.8 X |
| 4,375,905 | 3/1983 | Drouillard | 308/3.8 X |

FOREIGN PATENT DOCUMENTS 1457675 9/1966 France ........................... 308/3.8

Primary Examiner—Stuart S. Levy
Assistant Examiner—Lynn M. Sohacki
Attorney, Agent, or Firm—Herbert Furman

[57] ABSTRACT

A bearing assembly for upper and lower track members of a seat slide includes a flexible elongate member which is bowed by engagement with a longitudinal rib of the upper track member to engage roller end portions of the elongate member with flanges of the lower track member when the seat is unoccupied and engage bearing means between flanges of the track members to locate the components of the seat slide in rattle free relationship. When the seat is occupied, the upper track member is shifted downwardly to engage the roller end portions of the elongate member with the upper track member and provide rollers slidably supporting the upper track member on the lower track member.

4 Claims, 5 Drawing Figures

BEARING ASSEMBLY FOR SEAT SLIDE

This invention relates to a bearing assembly for seat slides.

The bearing assembly of this invention is particularly intended for use with seat slides which include upper and lower generally U-shape track members having base walls, side walls and terminal flanges located in respective opposed relationship to each other. Seat slides of this type are well known and bearing assemblies for such seat slides are also well known as evidenced by Ragsdale U.S. Pat. No. 2,970,015 and Drouillard U.S. Pat. No. 4,375,905, both assigned to the assignee of this invention. The upper track member supports on occupant seat for horizontal adjustment.

The bearing assembly of this invention generally differs from prior art bearing assemblies in that the upper track member is slidably supported on the lower track member by the roller end portions of a bowed flexible elongate member, such as a wound coil spring member or a rod like member of rubber or plastic material. In the preferred embodiment, the bearing assembly includes a body portion which is located between the base wall of the upper track member and the upper sides of the terminal flanges of the lower track member, and flanges or side portions which extend into the space between the opposed terminal flanges and side walls. The side portions rotatably locate ball bearings in such space which engage the opposing side walls and the opposing flanges of the track members when the seat supported by the seat slide is unoccupied and which engage only the opposing side walls of the track members when the seat is occupied, as will be further explained. The body portion is apertured laterally or transversely of the track members and the elongate member is freely received within such aperture. The center axle portion of the elongate member rotatably engages a depending longitudinal rib on the base wall of the upper track member to bow the elongate member and engage the roller end portions with at least the terminal flanges of the lower track member when the seat supported on the upper track member is unoccupied. This engagement of the bowed elongate member shifts the upper track member upwardly relative to the lower track member and engages the ball bearings with both the opposing terminal flanges and opposing side walls to locate the upper and lower track members, the elongate member, and the ball bearings in a rattle free relationship relative to each other.

When the seat is occupied, the weight of the occupant shifts the upper track member downwardly to further bow the elongate member. The terminal flanges of the upper track member move vertically downwardly from the terminal flanges of the lower track member and both disengage from the ball bearings. The ball bearings remain in engagement with the opposed side walls to laterally space the track members. The base wall of the upper track member moves downwardly into full engagement with the roller end portions of the elongate member whereby such end portions now act as rollers spacing the upper and lower track members and slidably supporting the upper track member on the lower track member for horizontal sliding movement to various horizontally adjusted positions. If the elongate member is a wound coil spring, the roller end portions are the same shape as the center portion axle and flexibly related thereto. The roller end portions are thus located coaxially of each other when the seat is occupied and form continuations of the bowed center axle portion only when the seat is unoccupied. If the elongate member is a rod like member of rubber or plastic, the roller end portions thereof are not flexibly related to the center axle portion and are therefore of frusto-conical shape to rotatably engage the planar base wall of the upper track member and the parallel related planar terminal flanges of the lower track member. Thus such end portions always form continuations of the bowed center portion whether the seat is occupied or unoccupied. The body portion of the bearing assembly includes ears which locate the elongate member relative to the aperture therein and ensure that the elongate member remains within the aperture.

If the terminal flanges of the lower track member are arcuate rather than planar, the roller end portions of the elongate member of rubber or plastic are grooved so as to rotatably engage such flanges. The end portions of a wound coil spring elongate member need not be changed in such instance.

The primary feature of this invention is that it provides an improved bearing assembly for the upper and lower track members of a seat slide, with such bearing assembly including a bowed flexible elongate member having a center axle portion engageable with a longitudinal rib on a wall of the upper track member and roller end portions engageable with the lower track member to locate such elongate member, the track members and interposed bearing means in rattle free relationship when an occupant seat supported by the seat slide is unoccupied. Another feature is that the upper track member is shifted downwardly when the seat is occupied to engage the wall thereof with the roller end portions of the elongate member and slidably support the occupied seat on the lower track member for horizontal adjustment. A further feature is that the elongate member may comprise a tightly wound coil spring which is bowed when the seat is unoccupied, the roller end portions of the spring being flexibly related to the center portion and being moved as units into coaxial relationship and in rolling engagement with the planar wall of the upper track member and parallel related planar flanges of the lower track member when the seat is occupied. Yet another feature is that such end portions of such a coil spring may tangentially engage arcuate flanges of the lower track member when the seat is both unoccupied and occupied and engage the planar wall of the upper track member when the seat is occupied. Still another feature is that the elongate member may comprise a rod like member of rubber or plastic having frusto-conically shaped roller end portions, with the center portion and end portions of such member being bowed when the seat is both occupied and unoccupied since the roller end portions are not flexibly related to the center axle portion.

These and other features of the invention will be readily apparent from the following specification and drawings wherein.

Figure 1:
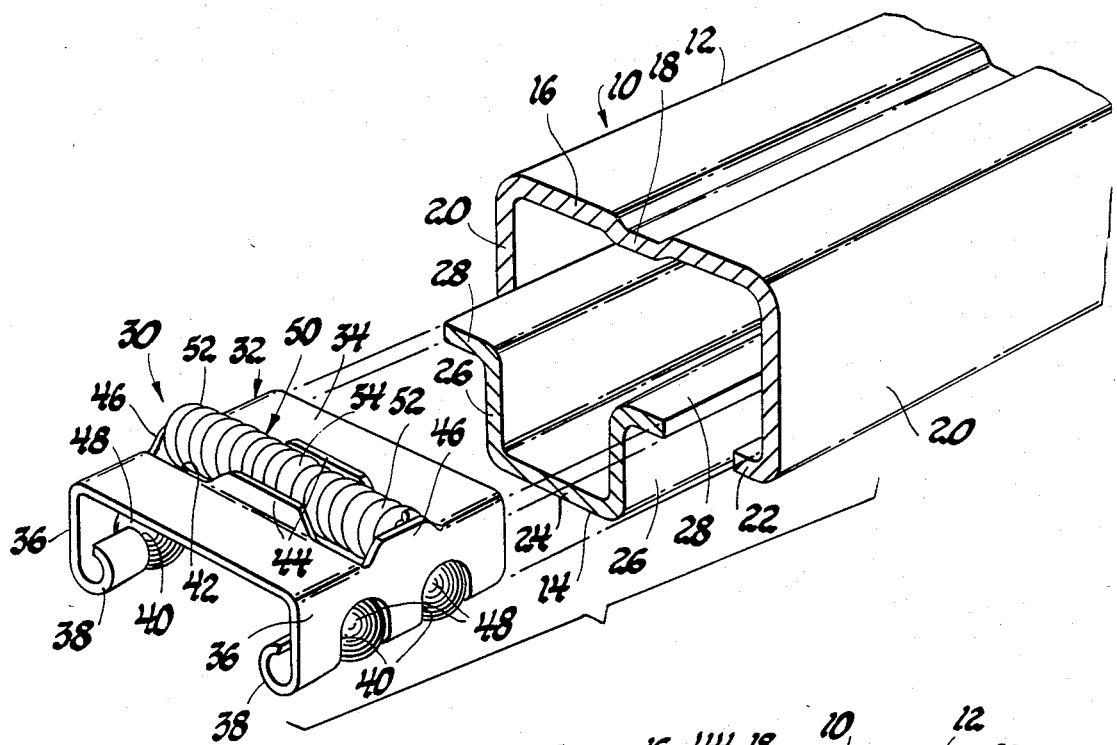
FIG. 1 is a partial exploded perspective view of a seat slide embodying a bearing assembly according to a first embodiment of this invention.

Referring now to the drawings, a seat slide designated generally 10 includes an upper track member 12 and a lower track member 14. The track member 12 includes an upper or base wall 16 having an integral laterally inwardly extending or depressed longitudinal rib 18. The side walls 20 of the upper track member 12 extend laterally of the base wall 16 and terminate in inwardly extending terminal flanges 22.

The lower track member 14 is encompassed by the upper track member 12 and includes a base wall 24 located in opposed relationship to the wall 16, a pair of side walls 26 located in opposed relationship to respective side walls 20 of track member 12, and laterally outwardly extending terminal flanges 28, each respective to and located in opposed relationship to a flange 22 of the upper track member 12.

A bearing assembly 30 according to a first embodiment includes a bearing unit 32 having a planar base wall or body portion 34 and side walls 36 which extend from the body portion and terminate in partially closed integral beads 38, each of which is slotted in two places at 40. The body portion 34 is slotted at 42 and the material from the slot is bent upwardly to form integral pairs of opposing ears 44 and 46.

Figure 2:
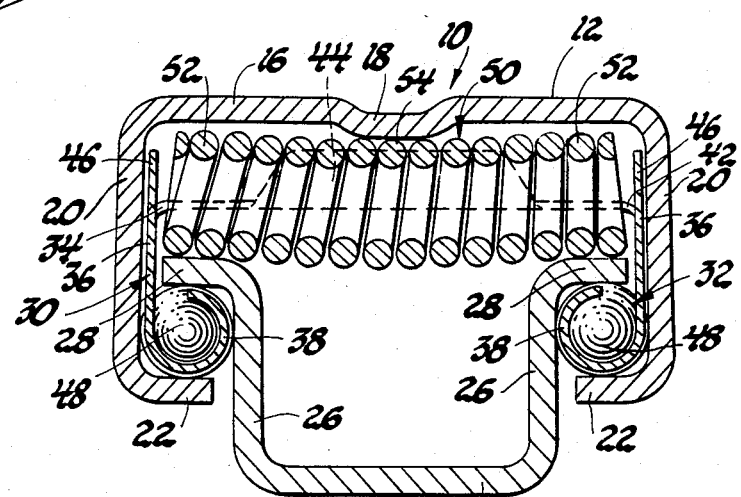
FIG. 2 is a sectional view of the seat slide when the seat supported thereby is unoccupied.

The bearing assembly 30 fits between the track members 12 and 14 as shown in FIG. 2, with the body portion 34 being located between the base wall 16 and flanges 28, the side walls 36 extending along the side walls 20 and the beads 38 being located between the opposed pairs of terminal flanges 22 and 28. A ball bearing 48 is rotatably captured in each of the slots 40 and engages a respective opposing pair of side walls 20 and 26 to locate the track members 12 and 14 laterally of each other.

A tightly wound coil spring 50 is freely received within the slot 42 between the pairs of ears 44 and 46. The roller end portions 52 of the spring rotatably seat on the upper sides of the terminal flanges 28 of track member 14 and the center axle portion 54 of the spring rotatably engages the longitudinal rib 18 of the upper track member 12, FIG. 2, to bow the spring 50. The bowed spring 50 biases track members 12 and 14 apart relative to each other to engage flanges 22 with ball bearings 48 and maintain the track members 12 and 14, the spring 50 and the ball bearings 48 in rattle free relationship when the seat supported on track member 12 is unoccupied. The extent of bowing of the spring will vary with tolerance variations in the spacing between the rib 18 and the terminal flanges 28. Also, the roller end portions 52 of spring 50 may engage the base wall 16 depending on such tolerance variations.

The pairs of ears 44 and 46 act to locate the spring 50 relative to the body portion 34 and prevent shifting of the spring out of the slot 42.

Figure 3:
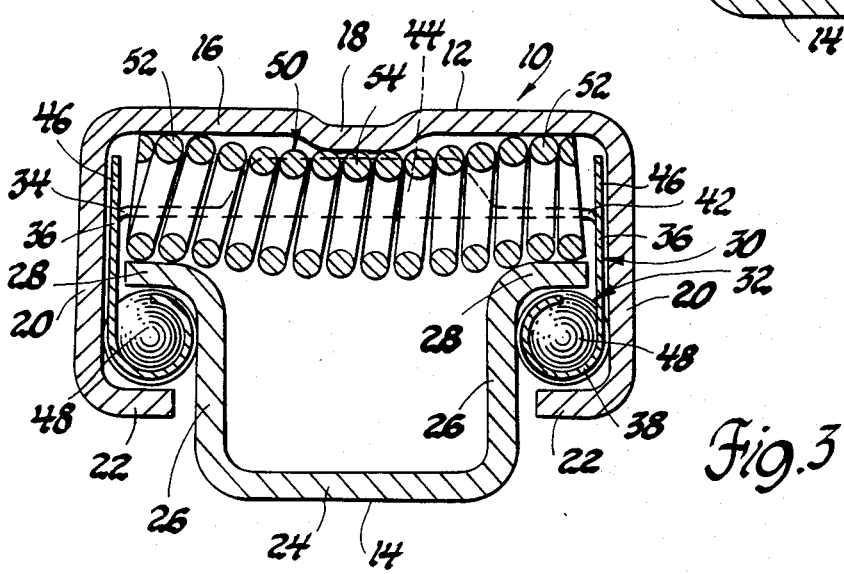
FIG. 3 is a view similar to FIG. 2 with the seat occupied.

As shown in FIG. 3, when the seat supported by the seat slide 10 is occupied, the upper track member 12 is shifted downwardly relative to the lower track member 14 to space the terminal flanges 22 from the balls 48 and to also engage the base wall 16 of the upper track member with the roller end portions 52 of the spring 50. The roller end portions 52 of the spring become coaxial relative to each other and act as coaxial rollers between the upper and lower track members to slidably support the upper track member 12 on the lower track member 14 for horizontal movement. The center axle portion 54 of the spring will become further bowed depending on the spacing of rib 18 relative to flanges 28 when the seat is unoccupied. The ball bearings 48 act to laterally space the track members 12 and 14 relative to each other due to their engagement between the opposed pair of side walls 20 and 26 of the track members 12 and 14. It will be understood that bearing means other than ball bearings may be provided between the side walls 20 and 26, such as the bearing portions 42 of the Drouillard bearing assembly.

Figure 4:
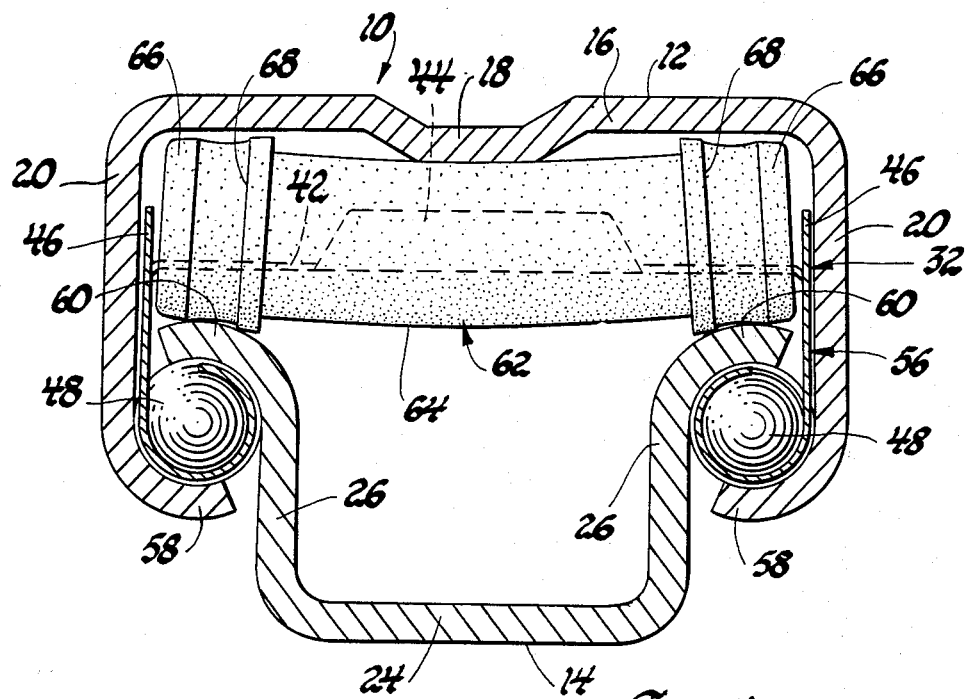
FIG. 4 is a view similar to FIG. 2 of a second embodiment.
Figure 5:
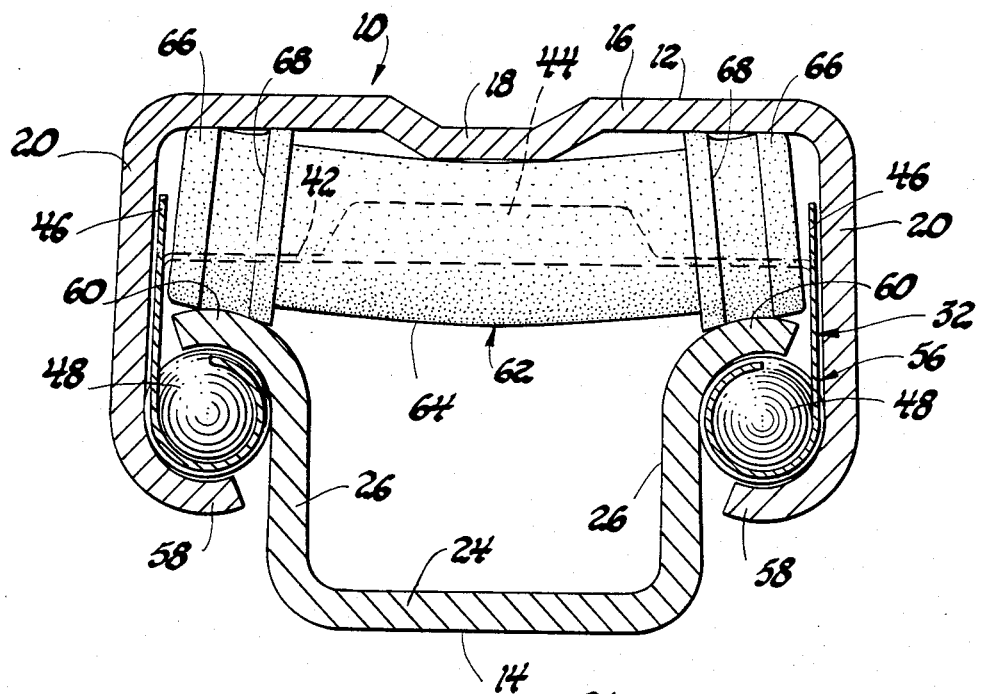
FIG. 5 is a view similar to FIG. 3 of the second embodiment.

Referring now to FIGS. 4 and 5 of the drawings, a second embodiment of a bearing assembly 56 according to this invention will be described and like numbers will be used for like parts. The seat slide 10 shown in these Figures is the same as that shown in FIGS. 1 through 3 except that the terminal flanges 58 of the upper track member 12 are arcuate rather than planar. Likewise the terminal flanges 60 of the lower track member 14 are arcuate and complementary to the flanges 58. The flanges 58 engage the ball bearings 48 as shown in FIG. 4 when the seat is unoccupied and are disengaged from such ball bearings as shown in FIG. 5 when the seat is occupied. The bearing unit 32 is the same as that shown in FIGS. 1 through 3. An elongate member 62 of plastic or nitrile rubber includes a center axle portion 64 and integral roller end portions 66 of generally frusto-conical shape. Each end portion 66 has a peripheral arcuate groove 68, the arcuate contour of which matches the arcuate contour of the terminal flanges 60 of the lower track member 14, as shown. The elongate member 62 is normally linear with the center axle portion 64 and end portions 66 being coaxial. Member 62 is freely received within the slot 42 of the bearing unit 32, between the pairs of ears 44 and 46.

When the seat is unoccupied as shown in FIG. 4, the rib 18 of the upper track member 12 engages the center axle portion 64 of the member 62 to bow member 62 and engage the grooves 68 of the roller end portions 66 with respective terminal flanges 60 of the lower track member 14. This engages the flanges 58 with the ball bearings 48 to maintain the ball bearings and opposing pairs of terminal flanges 58 and 60 in rattle free engagement with each other as in the first embodiment. The roller end portions 66 are normally spaced from the base wall 16 of the upper track member 12 as shown, with the extent of such spacing being dependent on tolerance variations between such base wall, the elongate member 62 and flanges 60.

When the seat is occupied as shown in FIG. 5, the weight of the occupant shifts the upper track member 12 downwardly relative to the lower track member 14 to disengage the terminal flanges 58 and 60 from the ball bearings 48 and engage the base wall 16 with the roller end portions 66 to slidably support the upper track member 12 on the lower track member 14.

The roller end portions 52 of the elongate member 50 are flexibly related to the inner axle portion of member 50 and can bend as units relative thereto. The roller end portions 66 of the elongate member 62 are not flexibly related to the center axle portion 64 of member 62. Further, it should be noted that although elongate member 62 has been shown in conjunction with arcuate flanges of the lower track member 14, member 62 will work equally as well with planar flanges such as 28. Likewise, the elongate member 50 will work equally as well with arcuate flanges, such as flanges 60.

Thus this invention provides an improved bearing assembly for seat slides.

The embodiments of the invention in which an exclusive property or privilege is claimed are defined as follows:

1. In a seat slide for supporting an occupant seat and including a pair of generally U-shaped track members, one track member including a base wall, a pair of side walls and a terminal flange extending from each of the side walls, the other track member including a base wall opposed to the one base wall, a pair of side walls, each located in opposed spaced relationship to a respective side wall of the one track member, and a terminal flange extending from each of the side walls and located in opposed spaced relationship to a respective terminal flange of the one track member, and bearing means located between the opposed respective terminal flanges, a bearing assembly for the track members comprising, a flexible elongate member including a center axle portion and roller end portions, means rotatably locating the elongate member transversely of the track members between the base wall of the one track member and the terminal flanges of the other track member, rib means on the base wall of the one track member engageable with the center axle portion of the elongate member to bow the elongate member and engage the roller end portions thereof with the terminal flanges of the other track member, the bowed elongate member biasing said track members apart relative to each other and engaging the bearing means with the opposed respective terminal flanges to locate the track members, the elongate member, and the bearing means in rattle free relationship when the seat is unoccupied, occupancy of the seat shifting the one track member relative to the other track member and engaging the base wall of the one track member with the roller end portions of the elongate member whereby such end portions act as rotatable support and spacing rollers between the track members and support the track members and seated occupant for relative adjustment.

2. In a seat slide for supporting an occupant seat and including a pair of generally U-shaped track members, one track member including a base wall, a pair of side walls and a terminal flange extending from each of the side walls, the other track member including a base wall opposed to the one base wall, a pair of side walls, each located in opposed spaced relationship to a respective side wall of the one track member, and a terminal flange extending from each of the side walls and located in opposed spaced relationship to a respective terminal flange of the one track member, and bearing means located between the opposed respective terminal flanges, a bearing assembly for the track members comprising, a wound coil spring including a center axle portion and flexibly related roller end portions, means rotatably locating the coil spring transversely of the track members between the base wall of the one track member and the terminal flanges of the other track member, rib means on the base wall of the one track member engageable with the center axle portion of the coil spring to bow the coil spring and engage the roller end portions thereof with the terminal flanges of the other track member, the bowed coil spring biasing said track members apart relative to each other and engaging the bearing means with the opposed respective terminal flanges to locate the track members, coil spring and bearing means in rattle free relationship when the seat is unoccupied, occupancy of the seat shifting the one track member relative to the other track member to engage the base wall of the one track member with the roller end portions of the coil spring and end portions bent into coaxially related rollers which act to rotatably support the track members and seated occupant for relative adjustment.

3. In a seat slide for supporting an occupant seat and including a pair of generally U-shaped track members, one track member including a base wall, a pair of depending side walls and a terminal flange extending from each of the side walls, the other track member including a base wall opposed to the one base wall, a pair of side walls, each located in opposed spaced relationship to a respective side wall of the one track member, and a terminal flange extending from each of the side walls and located in opposed spaced relationship to a respective terminal flange of the one track member, and bearing means located between the opposed respective terminal flanges, a bearing assembly for the track members comprising, a flexible elongate member including a center axle portion and roller end portions, means rotatably locating the elongate member transversely of the track members between the base wall of the one track member and the terminal flanges of the other track member, rib means on the base wall of the one track member engageable with the center axle portion of the elongate member to bow such center axle portion and bias the roller end portions into engagement with the terminal flanges of the other track member, the one track member shifting relative to the other track member under the weight of a seated occupant to engage the base wall of the one track member with the roller end portions of the elongate member whereby such end portions act as rotatable support and spacing rollers between the track members and support the track members and seated occupant for relative adjustment.

4. In a seat slide for supporting an occupant seat and including a pair of generally U-shaped upper and lower track members, the upper track member including a base wall, a pair of depending side walls and a terminal flange extending from each of the side walls, the lower track member being partially encompassed within the upper track member and including a base wall opposed to the one base wall, a pair of side walls, each located in opposed spaced relationship to a respective side wall of the upper track member, and a terminal flange extending from each of the side walls and located in opposed spaced relationship to a respective terminal flange of the one track member, and bearing means located between the opposed respective terminal flanges, a bearing assembly for the track members comprising, an elongate member of flexible material including a cylindrically shaped center axle portion and frustoconically shaped roller end portions, means rotatably locating the elongate member transversely of the track members, rib means on the base wall of the upper track member engageable with the center axle portion of the elongate member to bow the elongate member and engage the roller end portions thereof with the terminal flanges of the lower track member, the upper track member shifting vertically downwardly under the weight of a seated occupant to insure engagement of the base wall thereof with the roller end portions of the elongate member whereby such end portions act as rotatable support and spacing rollers between the track members and support the upper track member and seated occupant on the lower track member for horizontal adjustment.

* * * * *